United States Patent [19]

Kristiansen et al.

[11] Patent Number: 4,460,609

[45] Date of Patent: Jul. 17, 1984

[54] PROCESS FOR MAKING PASTA FILATA TYPE CHEESE

[75] Inventors: Bjarne Kristiansen; Tage Christiansen, both of Nibe; Poul F. Jensen, Aalborg; Bent Pedersen; Jens B. Kjaer, both of Hjallerup; Kjeld Kristensen, Vodskov; Svend O. Jensen, Dronninglund; Poul Lindstroem, Broenderslev; Bjarne Kjaer, Hjallerup, all of Denmark

[73] Assignee: Oerum Sogns Mejeri ApS, Hjallerup, Denmark

[21] Appl. No.: 443,907

[22] Filed: Nov. 23, 1982

Related U.S. Application Data

[63] Continuation-in-part of Ser. No. 400,072, Jul. 20, 1982, abandoned.

[30] Foreign Application Priority Data

Jul. 20, 1981 [SE] Sweden .............................. 8104449

[51] Int. Cl.³ .......................... A23C 9/14; A23C 19/02
[52] U.S. Cl. .......................................... 426/39; 426/40; 426/582; 426/491

[58] Field of Search .................. 426/582, 491, 39, 40, 426/42

[56] References Cited

U.S. PATENT DOCUMENTS 3,692,540  9/1972  Mauk ................................... 426/582
3,899,596  8/1975  Stenne ................................. 426/582
4,341,801  7/1982  Weissman ........................... 426/582

FOREIGN PATENT DOCUMENTS 724095 12/1965 Canada ................................. 426/39

Primary Examiner—Arnold Turk
Assistant Examiner—Elizabeth J. Curtin
Attorney, Agent, or Firm—Davis, Hoxie, Faithfull & Hapgood

[57] ABSTRACT

In the manufacture of Cheese of the "pasta filata" type, an intermediate product is obtained by carrying out the coagulation of a protein concentrate, obtained by ultrafiltration of milk, by means of an acid whose concentration is selected so that the calcium concentration, in the coagel resulting from the coagulation, after separation of liquid, is below about 1.5% calculated on the weight of fatfree dry solids.

10 Claims, 1 Drawing Figure

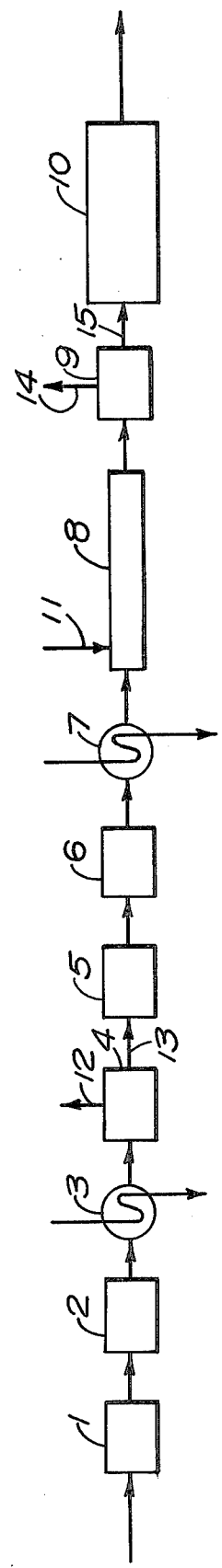

PROCESS FOR MAKING PASTA FILATA TYPE CHEESE

This application is a continuation-in-part of application Ser. No. 400,072, filed July 20, 1982 and now abandoned.

This invention relates to a process for producing a cheese of the "pasta filata" type, from a protein concentrate obtained by ultrafiltration of milk.

"Pasta filata" refers to a type of Italian cheese with a fibrous structure, for instance, Mozzarella. In the production of such cheeses there is a kneading or stretching step at elevated temperature. In order that the final product have the desired features, the intermediate product which is subjected to the kneading and stretching, must have certain properties. The intermediate product constitutes, substantially, coagulated casein and fat, a so-called coagel, which can be made by enzymes, that is to say by rennet, by a bacterial culture or by direct acidification.

In recent years the dairy industry has developed cheesemaking processes in which a casein concentrate, obtained from milk by ultrafiltration, is coagulated. If such a casein concentrate is to be utilized for the manufacturing of "pasta filata" cheese, its calcium content must be reduced. This is conventionally done by dilution with water, with the mixture so obtained being treated by one more subsequent ultrafiltration steps. The object of this operation is to lower the calcium concentration to such a value that in the subsequent coagulation a coagel is obtained, which can be employed in the kneading and stretching steps referred to, leading to the final "pasta filata" cheese.

The manufacture of such cheese is disclosed, for instance in J. Dairy Sci. (1978) Vol. 61, No. 6, p. 701-709.

By carrying out the process in this way, a coagel is obtained suitable for processing directly to "pasta filata" type cheeses in a simple and inexpensive way.

It is especially suitable to carry out the initial separation by ultrafiltration in such a way that the fatfree dry solids concentration of the concentrate is brought to be within the range between about 13 and about 28% by weight.

In a preferred embodiment the coagulation is carried out by adding the concentrate to a solution of the acid.

The coagulation is best performed so that the separated coagel shows a pH of from about 4.9 to about 5.2.

The most favorable temperature range for performing the coagulation is from about 55° to about 65° C.

Various acids may be used for the coagulation. Particularly suitable acids have proved to be citric acid and acetic acid. Acids like lactic acid or tartaric acid can also be used. Even mineral acids such as 30% Nitric Acid, 80% Phosphoric Acid, and the like can be used, provided that a calcium-binding agent like EDTA (ethylene diamine tetraacetate) is added.

The concentration of acid is, of course, determined by that required to obtain the necessary reduction in calcium and this will depend on the acid selected and the properties of the particular concentrate. However, in general, the solution to which the concentrate is added will contain between about 0.05% and about 1.0% by weight of the acid.

Following coagulation, in the liquid separation step, the dry solids content of the coagel is brought to between about 40% and about 48% by weight. The fatfree dry solids content is between about 25% and about 33% by weight.

Two ultrafiltration steps involve substantial additional expense. It is an object of this invention is to provide a process of the type mentioned which is simple and economical, which can be performed continuously, and wherein a so-called "melting" step for the coagel, before the kneading and stretching step, can be omitted.

A process according to the invention, starting with a milk raw material, may comprise the following steps:
  (a) optionally, a conventional pretreatment of the milk such as homogenization and pasteurization,
  (b) ultrafiltration of the milk, with or without such homogenization and pasteurization, into:
    a filtrate containing lactose and mineral compounds; and
    a concentrate, containing fat and proteins at a substantially higher concentration than raw milk.
  (c) optionally, pasteurization and homogenization of the concentrate,
  coagulation of the concentrate, with or without the homogenization and pasteurization referred to, by an acid, to a coagel.
  (e) separation of liquid from the coagel to increase the dry solids content of the same.
  (f) kneading or stretching of the coagel.

Subsequently the kneaded and stretched product may be treated to make the cheese in the conventional way.

According to the invention the coagulation is carried out with acid in such a concentration that the calcium concentration, calculated as % Ca on fatfree dry solids in the coagel after the separation of the liquid, is below about 1.5%.

The process according to the invention will now be described in more detail, reference being made to the drawing, which is a flow diagram of a plant for carrying out the process according to the invention. The drawing is purely schematic, the individual processing units being conventional in the art.

Referring to the drawing, a plant for carrying out the process of the invention comprises a series of units, which are coupled by pipes, namely a first homogenization apparatus 1, a first pasteurization apparatus 2, a first cooler 3, an ultrafilter 4, a second pasteurization apparatus 5, a second homogenization apparatus 6, a second cooler 7, a tubular reactor 8, a whey sieve 9 with a liquid discharge opening 14 and a coagel outlet 15, and a cheese making unit 10, not described in detail, for kneading, forming, chilling, salting and packaging. A pipe 11 for the addition of acid is connected to the reactor 8. The ultrafilter is provided with a filtrate discharge outlet 12 and a concentrate discharge outlet 13, which latter is connected to the second pasteurization apparatus 5.

To exemplify the process according to the invention data from the actual manufacture of cheese in a plant of the type described above will be given. In this case a 10 meter pipe with an inner diameter of 50 mm, shown as 8 in the drawing, was used as the tubular reactor.

As raw material, milk containing 2.95% fat and 3.3% raw protein was used, which milk was homogenized in the homogenization apparatus 1 at 150 bars and 60° C., and was pasteurized in the pasteurization apparatus 2 at 79° C. for 14 sec. It was then cooled to 55° C. in the cooler 3. The milk thus cooled was separated in the ultrafilter 4 to give a filtrate, which was discharged through the outlet 12, and a concentrate containing 34% dry solids, 14.2% fat and 13.1% raw protein. This concentrate was pasteurized in the pasteurization apparatus 5 at 80° C. for 30 sec. and was then homogenized in the homogenization apparatus 6 at 85 bars and 60° C. It was then cooled in the cooler 7 to 15° C. Then the cooled concentrate was fed to the tubular reactor 8 at a rate of 500 liters/hour simultaneously with a 0.4% by weight citric acid solution having a temperature of 75° C., pumped into the reactor 8 at a rate of 1500 liters/hour. After dewatering in the whey sieve 9, which sieve had a mesh size of 150×200/μm, the coagel had a dry solids content of 48%. The calcium concentration, calculated on fatfree dry solids, was 1.25% Ca.

The coagel was then fed into the unit 10 for kneading and forming into filaments of 40 mm diameter, which filaments were cooled in cold water, salted in saturated salt lye for 2 hours and then packed in vacuum bags.

The final product was a Mozzarella having a quality equal to that of conventional manufacture, and having the following composition, by weight

|  |  |
| --- | --- |
| Dry solids | 46.5% |
| protein | 21.9% |
| ash | 4.12% |
| fat content | 19.2% |
| salt | 2.4% |

The calcium concentration, calculated on fatfree dry solids, was 1.25%.

Corresponding trials were made using other acids. Using 0.8% acetic acid, the final product contained 1.42% Ca on fatfree dry solids. Using 0.8% lactic acid gave 1.29% Ca and 0.8% tartaric acid, 1.33% Ca. On the other hand, when phosphoric acid was used, without EDTA, 1.63% Ca was obtained and the product was unacceptable.

We claim:

1. In a process for producing cheese of the pasta filata type which comprises treating milk by ultrafiltration to give a concentrate containing elevated amounts of fat and protein, adding an acid to the concentrate to coagulate the concentrate and form a coagel, separating liquid from the coagel to increase its dry solids content, and subjecting the coagel to a kneading and stretching step, the improvement which comprises regulating the concentration of the acid fed to the coagulation step to obtain a calcium concentration in the coagel, after separation of liquid, of less than 1.5% based on the weight of fatfree dry solids.

2. The process claimed in claim 1 wherein the milk is homogenized and pasteurized prior to ultrafiltration.

3. The process claimed in claim 1 wherein the concentrate obtained by ultrafiltration is homogenized and pasteurized.

4. The process claimed in claim 1 wherein the ultrafiltration is carried out to give a fatfree dry solids concentration in the concentrate of from about 13 to about 28% by weight.

5. The process claimed in claim 1 and comprising coagulating said concentrate by feeding it into a solution of acid.

6. The process claimed in claim 1 wherein the separated coagel has a pH of from about 4.9 to about 5.2.

7. The process claimed in claim 1 and comprising carrying out said coagulation at a temperature of from about 55° to about 65° C.

8. The process claimed in claim 1 wherein the acid is citric, acetic, lactic or tartaric acid.

9. The process claimed in claim 1 wherein the acid is a mineral acid and is used with a calcium binding additive.

10. The process claimed in claim 9 wherein the calcium binding additive is ethylene diamine tetraacetate.

* * * * *